(12) United States Patent
Eaton (10) Patent No.: US 7,092,568 B2
(45) Date of Patent: *Aug. 15, 2006

(54) LIMITING STORAGE OR TRANSMISSION OF VISUAL INFORMATION USING OPTICAL CHARACTER RECOGNITION

(75) Inventor: Eric T. Eaton, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 739 days.

This patent is subject to a terminal disclaimer.

(21) Appl. No.: 10/292,213

(22) Filed: Nov. 12, 2002

(65) Prior Publication Data

US 2004/0091177 A1    May 13, 2004

(51) Int. Cl.
*G06K 9/00* (2006.01)

(52) U.S. Cl. ............ 382/181; 382/173; 382/176; 382/276; 382/282; 382/299; 382/306

(58) Field of Classification Search ........ 382/181, 382/173, 176, 177, 276, 282, 299, 306, 135, 382/309; 399/366; 358/1.14
See application file for complete search history.

(56) References Cited

U.S. PATENT DOCUMENTS 5,452,099 A * 9/1995 Von Meister ............ 358/403
5,666,191 A * 9/1997 Hasegawa et al. ......... 399/366
5,982,956 A * 11/1999 Lahmi ..................... 382/306
6,040,856 A * 3/2000 Sakaegi ................. 348/231.6
6,185,321 B1 * 2/2001 Fukushima et al. ....... 382/135
6,801,642 B1 * 10/2004 Gorday et al. ............ 382/118
6,807,294 B1 * 10/2004 Yamazaki ................. 382/135
6,980,308 B1 * 12/2005 Masaki et al. ........... 358/1.14

FOREIGN PATENT DOCUMENTS

| JP | 10-128648 | * | 5/1998 |
| JP | 11-200909 | * | 7/1999 |
| JP | 2000-282382 | * | 3/2002 |

* cited by examiner

*Primary Examiner*—Bhavesh M. Mehta
*Assistant Examiner*—John Strege
(74) *Attorney, Agent, or Firm*—Randi Karpinia; Douglas S. Rupert

(57) ABSTRACT

A method carried out at a device (700), of limiting visual information that can be stored or transmitted captures a visual image (408). Whenever a control signal is detected (412) at the device (700), an optical symbol recognition of the image is performed. The method further includes comparing symbols generated by the optical symbol recognition routine to one or more predetermined symbols. When a symbol match to one or more predetermined symbols is generated, at least a portion of the visual image (408) is obscured.

28 Claims, 6 Drawing Sheets

| 510 PREDETERMINED SYMBOLS | 520 RESPONSE | NOTIFY SECURITY |
|---|---|---|
| 530 CONFIDENTIAL | 535 REQUEST PASSWORD | YES |
| 540 CONFIDENTIAL SECRET | 545 BLUR IMAGE | YES |
| 550 INTERNAL USE ONLY | 555 SEND WARNING MESSAGE | YES |
| 560 CONFIDENTIAL TOP SECRET | 565 DELETE ALL IMAGES | YES |
| 570 MCP | 575 REQUEST PASSWORD | YES |

LIMITING STORAGE OR TRANSMISSION OF VISUAL INFORMATION USING OPTICAL CHARACTER RECOGNITION

CROSS REFERENCE TO RELATED APPLICATIONS

This application is related to pending U.S. application Ser. No. 10/185,985, filed Jun. 26, 2002, and assigned to Motorola, Inc., entitled "Method And Apparatus For Limiting Storage Or Transmission Of Visual Information."

FIELD OF THE INVENTION

This invention relates generally to the field of wireless video transmission devices and methods. More particularly, this invention relates to providing security for confidential information that can be captured by such wireless video transmission devices.

BACKGROUND OF THE INVENTION

Cellular telephones, PDAs (Personal Digital Assistants) and other portable electronic devices have become fixtures of everyday life over the last several years. As they evolve, prices continue to fall while the devices' capabilities have expanded. Currently, such devices can be used in many places to make wireless connection to the Internet, play games as well as carry out email and other text messaging functions. It can readily be anticipated that as time goes by, the capabilities of such devices will continue to expand as prices continue to fall making use of such devices a permanent part of people's daily lives.

Wireless two-way communication products are emerging which will enable users to have portable live video and still image transmission capabilities. For example, cellular telephones and personal digital assistants (PDAs) are being developed with an integrated camera and display to provide video telephone calls and image capture. Similarly, digital cameras will likely be equipped with wireless transceivers, enabling them to transfer images to other devices for printing, storage, and sharing. Such capability is likely to become more prevalent in the future and it can reasonably be expected that the resolution of the images captured will be enhanced over time. It is also expected, due to memory constraints in portable devices, that still images will be captured then transmitted over wireless networks and the Internet for remote storage Recently, Optical Character Recognition (OCR) has become more and more of a "mainstream" application. The technology has become accurate, fast and stable. In addition, as the power of the OCR systems has considerably advanced, the prices of the OCR software applications have decreased. Documents of almost any form can be readily converted into editable computer files.

Optical Character Recognition is a process of capturing an image of a document and then extracting the text from that image. During the recognition process, the document is analyzed for several key factors such as layout, fonts, text and graphics. The document is then converted into an electronic format that can be edited with application software. The document can be of many different languages, forms and features. For example, some of the latest OCR applications can read over ninety (90) different languages, and can read tables as well as images contained within a document. The latest OCR readers utilize neural network-based recognition and feature extraction technologies to achieve accuracy rates over 99.9975%, or one character misread in 40,000. To achieve even higher accuracies rates software applications that check digit validation can be used to reduce this error rates to fewer than one in 3,000,000 characters.

There are two basic methods used for OCR: Matrix Matching and Feature Extraction. The simpler and most common of the two forms is Matrix Matching. It compares what the OCR device sees as a character against a library of character matrices or templates. When an image matches one of these prescribed templates within a given level of accuracy, the OCR application assigns that image the corresponding American Standard Code for Information Interchange (ASCII) symbol. Feature Extraction, also known as Intelligent Character Recognition (ICR), is OCR without strict matching to prescribed templates. The amount of computing intelligence that is applied by a device varies the results for ICR applications. The application looks for general features such as open areas, closed shapes, diagonal lines, line intersections, etc. When there is little or no variations within the type styles and there is a limited set of type styles the Matrix Matching is the preferable method. Where the characters are less predictable Feature Extraction is the preferred method.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
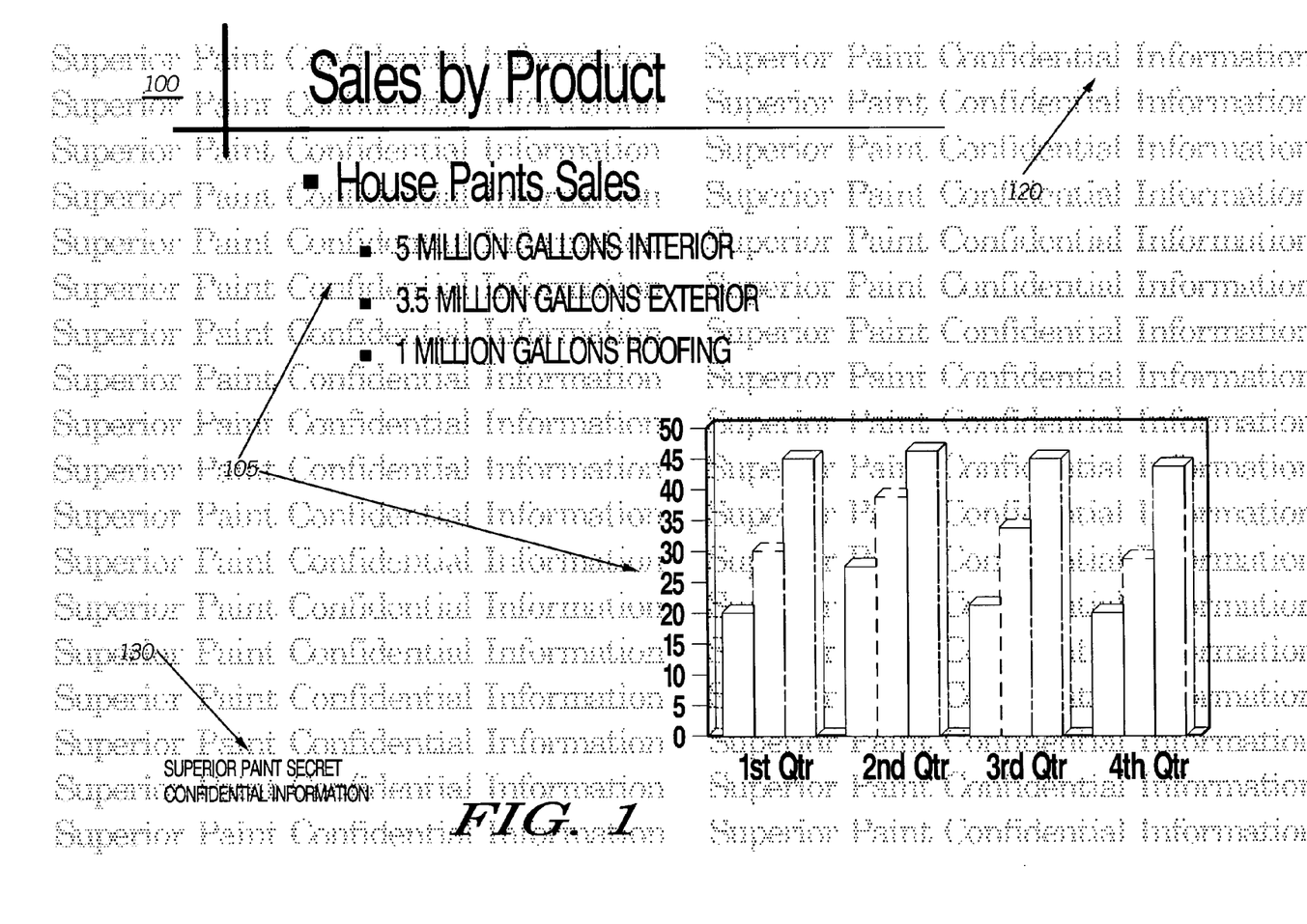
FIG. 1 illustrates a sample image.

Video/image recording capability in a cellular telephone and/or other wireless communication devices opens up the possibility of use of such devices for transmission of live images from locations where such images can contain protected information. Examples of such locations include work environments where cameras are not currently allowed, secure government and military facilities, and sporting events where broadcast of images of the event are protected by licensing agreements to broadcast companies. Consider, for example, the image 100 illustrated in FIG. 1. This image depicts confidential sales information (105) in the form of a bar graph and sales figures. The confidential information is located against a background watermark (120) that indicates the information is confidential information. The document also has a confidential statement (130) indicating a level of "Secret" confidentially for the document. Thus, the confidential information could be accidentally or intentionally compromised by transmission of image 100 outside of the facility.

As video capable telephones and other communication devices become a commonplace belt worn or purse carried device for consumers, it may not always be acceptable to require that users remove these products in such secure locations, since the users depend on them for communications. This introduces the problem of how to protect the confidential, proprietary, sensitive or protected content of live images, while allowing large numbers of users to use their devices in these locations.

Figure 2:
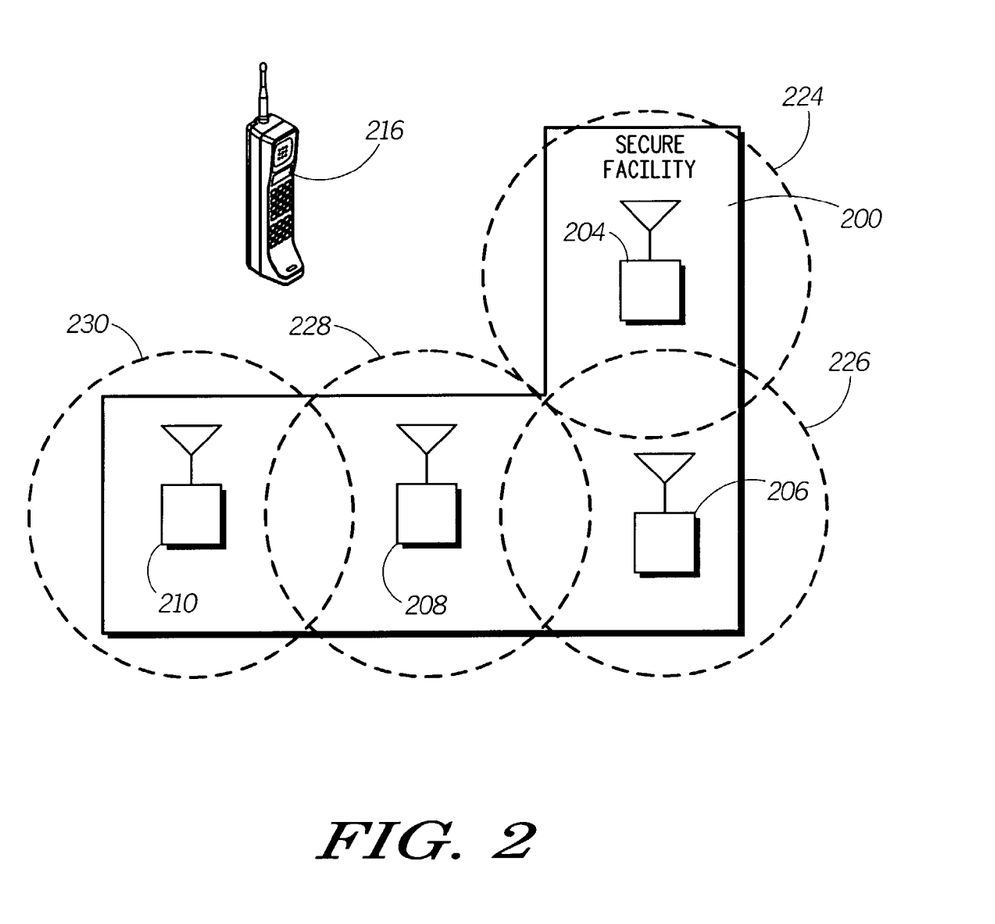
FIG. 2 is a diagram depicting a secure facility using a system for limiting storage or transmission of visual images consistent with certain embodiments of the present invention.

The present invention, in certain exemplary embodiments, addresses this problem by enabling control of the user device's image coding in specific user locations, for example via a wireless connection. This is illustrated in FIG. 2 in which a secure facility 200 incorporates one or more transmitters such as 204, 206, 208 and 210 that operate to control the wireless device (e.g., a cellular phone in the present example) to modify its image transmission ability. The wireless device, in accordance with the present invention, can be a mobile cellular telephone, a mobile radio data terminal, a mobile cellular telephone having an attached data terminal, a personal computer having a communication means either built in or attached, a two way messaging device, or an equivalent. Whenever a device 216 such as a cellular telephone enters designated locations that are protected by an envelope of transmissions from the wireless transmitters 204, 206, 208 and 210 (shown as dashed circles 224, 226, 228 and 230 representing the transmission range of transmitters 204, 206, 208 and 210 respectively), a wireless connection is established and used to control the device 216's image coding so that specific regions of the image (or entire image) are encoded with reduced quality (reduced Signal to Noise Ratio, reduced bits per pixel, added noise or distortion, etc.), or are omitted, or are substituted with alternate information. In short, at least a portion of the image is obscured to inhibit the transmission of confidential or proprietary information. This method allows the user to have limited use of the video/image communications facilities of device 216 while protecting a portion of the image content.

While this example uses wireless connections from transmitters 204, 206, 208 and 210, achieving this type of control in specific locations can be accomplished by any of a number of techniques including, but not limited to localized transmission of dedicated wireless control signals to the user devices (e.g. a beacon or network of beacons as described above). It will be appreciated by one of ordinary skill in the art that the control signal can be a preprogrammed setting in the user device, a manual code entry, or an equivalent. Alternatively, this type of control can be accomplished by a user device connection to a wireless network node (cell) or wireless LAN (Local Area Network) with dedicated signaling that controls image coding of all users connected to that network node; wireless network control of individual users' devices based on current user location information (Global Positioning System, etc.), location of user node (cell) connectivity, user ID (identification), user profile, or any combination therein.

Return of image coding control to the user device can be related to a loss of the wireless signal with the control information, reception of a wireless signal with the control information that returns image coding control to the user device, a change to a new network node (cell), or a detected change of location; and can incorporate timers to maintain control through short losses of the control signal (e.g. device power off/on).

Several existing technologies can be used to implement the present invention in a manner consistent with certain embodiments, including, but not limited to: digital image coding methods that allow flexible control of which portions of an image are transmitted and corresponding image quality (e.g. JPEG (Joint Photographic Expert Group) with distortion rate control and region of interest coding, MPEG (Moving Pictures Expert Group) object-based coding), user devices with image/video communications (image coding) capabilities, and capability to control the image coding of user image/video via wireless signaling.

Several possible techniques for implementing the image coding control include the following, and apply to 'still' or 'motion' image coding, but those skilled in the art will appreciate that other techniques can also be used:
  1) Reduce image quality of the entire image (low SNR (signal to noise ratio), bits per pixel, etc), omit entire image, or substitute alternate image.
  2) Substitute images can be transmitted instead of the protected regions of the transmitted image. The alternate image can be, for example, a blank image, designated messages indicating the reason image is being limited, or even advertising.

Figure 3:
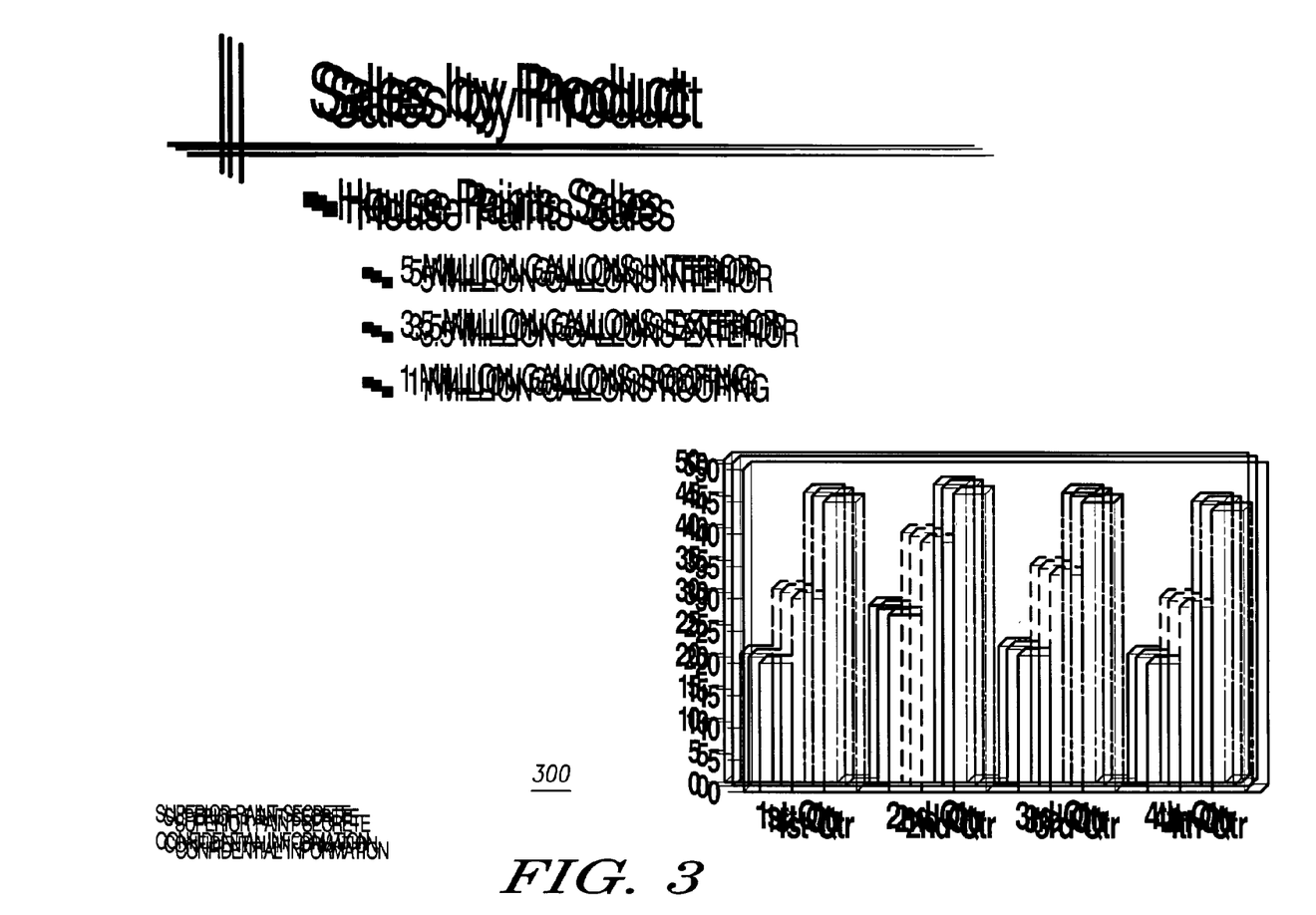
FIG. 3 depicts an image with a blurred background consistent with certain embodiments of the present invention.
Figure 4:
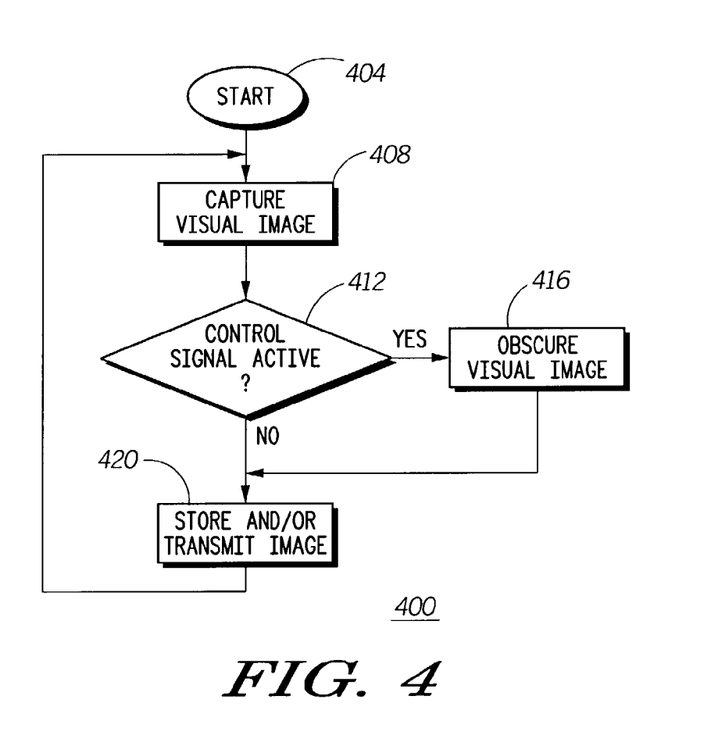
FIG. 4 is a flow chart of a process consistent with certain embodiments of the present invention

FIG. 3 represents an image 300 encoded with low resolution coding resulting in a blurry image. For example, the image 300 is coded with 2 bits per pixel with some omitted subbands instead of a using a normally higher resolution of 8 bits per pixel typically used for image coding. The processes described above can be broadly depicted as shown in a process 400 of FIG. 4 starting at Step 404. At Step 408, the camera forming a part of the wireless device (e.g., the device 216) captures a visual image (still or moving). When the device 216 is actively receiving a control signal from a local transmitter (e.g., transmitters 204, 206, 208 or 210) at Step 412, then, at Step 416, the image is processed to obscure it in some manner (e.g., remove or obscure background, delete image, replace image, etc.). The obscured image is then stored and/or transmitted at Step 420, and the process returns to the start, Step 404. In the event no active control signal is present at Step 412, then at Step 420 the image is transmitted unobscured.

Thus, a method carried out at a user device, of limiting visual information that can be stored or transmitted, consistent with certain embodiments of the present invention involves capturing a visual image; detecting a control signal at the user device; responsive to the control signal, obscuring at least a portion of the visual image to produce an obscured visual image. The image can then be stored and/or transmitted.

Figure 5:
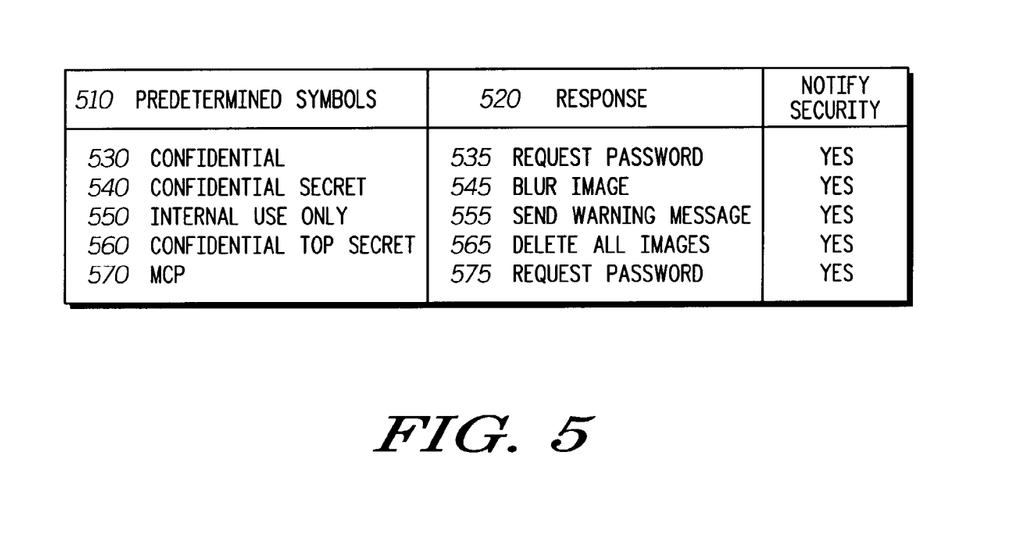
FIG. 5 illustrates a sample table of stored symbols utilized by the present invention.

FIG. 5 is an example table of the one or more predetermined symbols (510) and a plurality of associated responses (520). For example, Confidential Top Secret (560) symbol detection will result in deleting the image and a notification message being sent (565) to the appropriate security personnel. While Internal Use Only (550) symbol detection will result in a warning message being transmitted (555) in place of the original document.

Figure 6:
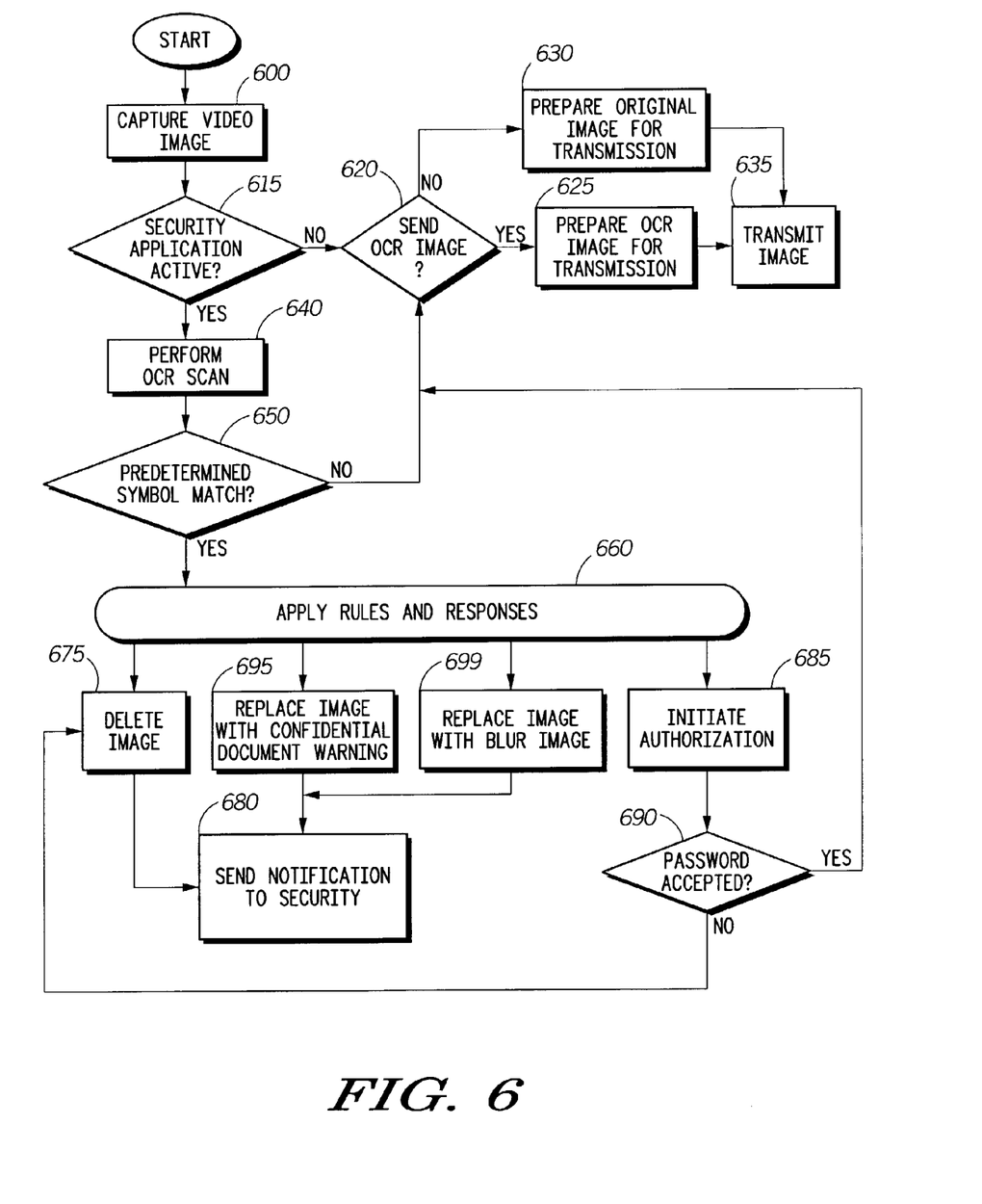
FIG. 6 is a flow chart illustrating various methods for obscuring an image consistent with certain embodiments of the present invention.

FIG. 6 illustrates a flow chart for the process of determining when an image should be obscured and depicts one with several options that could be implemented under control of the system imposing the restriction on video, the user or may simply represent several hypothetical options with only a single (or several) options actually being available. This flow chart is intended only to be illustrative of several of the options available and consistent with embodiments of the present invention and should not be considered limiting. At Step 600, the document is read and captured by the video portion of the device. At this point the contents of the image are unknown; and the image is further processed to determine the contents of the document. At Step 615, the device determines if a secure transmission and copy application is active. When the security application is not active in Step 615, then in Step 620, the device determines if the image needs to be converted by an OCR application. When in Step 620, it is determined that image should be sent without OCR transformation then the image is prepared for transmission by methods that are commonly used in sending images over networks in Step 630, and transmitted in Step 635. When in Step 615, it is determined that the security application is active then in Step 640, the OCR software routines extract text information out of each shape in the image and assigns a symbol utilizing methods that are well known in the state-of-the-art of character recognition. In Step 650, software routines check the assigned symbols against one or more predetermined symbols (510). When the one or more predetermined symbols (510) are not detected at Step 650, the device goes to step 620. In Step 620, it is determined if the OCR version of the image or another version of the image should be transmitted. When the OCR version is determined to be transmitted in Step 620, the image is prepared for transmission in Step 625, and then transmitted in Step 635. When at Step 650, the one or more predetermined symbols (510) were discovered within the image then at Step 660, the software routines apply the rules and associated responses (520) to determine the appropriate action that should be taken with the document. At Step 660, the device determines if the document is allowed to be transmitted or copied under any circumstances by the mobile device. All information from the document is deleted at Step 675, when in Step 660, the document is determined to be restricted from being transmitted or copied. At Step 680, a notification message is transmitted to notify the proper personal that an attempt has been made to copy and or transmit a restricted document. The message in Step 680 can contain information indicating level of security of document (130) and which document has been copied. The device, which created the image of the document, can also identify itself within the notification message. When at Step 660, it is determined that the document is allowed to be transmitted but some form of authorization is required prior to transmission the device initiates such authorization in Step 685. This can include a password that can be entered on the device or can be a password request to another device. At Step 690, when the document is allowed to be transmitted or copied with a password approval then a password request is generated for the user. When the correct password is not entered in Step 690, the device goes to Step 675, where the document is deleted. When in Step 690, the authorization requirements are met then the device goes to Step 620, for preparation for transmission. When in Step 660, it is determined that the image is not allowed to be transmitted and further that a confidential warning message should be transmitted in its place then in Step 695, a Confidential Document Warning message will be transmitted and stored on the device in its place. When in Step 660, it is determined that the image is not allowed to be transmitted and that a blurred version of the document should be sent then in Step 699, a blurred image is transmitted and stored by the device. After Step 695, and Step 699, the device will go to Step 680, where a warning message is sent to a security monitor.

Wireless control can be implemented via connection to a wireless network. It will be appreciated by one of ordinary skill in the art that the wireless network, in accordance with the present invention, can function utilizing any wireless radio frequency channel, for example, a two-way messaging channel, a mobile cellular telephone channel, or a mobile radio channel. Similarly, it will be appreciated by one of ordinary skill in the art that the wireless network can function utilizing other types of wireless communication channels such as infrared channels and/or Bluetooth channels. The wireless network can include, for example, a large-scale cellular system, where specific cells or pico-cells could correspond to image-protected areas. Alternatively, a user may be able to use multiple wireless networks (e.g. a GSM (Global System for Mobile Communications) network and a Bluetooth® piconet), where one of the networks controls image coding for all transmissions on either network. An Example of this is included below, but it will be understood that this is an illustrative example and should not be considered limiting.

EXAMPLE

At a corporate research and development center, the entire facility could be covered with a short-range wireless network (e.g. wireless local area network) having piconet base stations inside the building. These piconets could be installed and coordinated such that users in the building are always within piconet coverage, while users some distance outside the facility are out of range of the wireless local area network (WLAN) coverage.

To be allowed in the building, a CDMA (Code Division Multiple Access) telephone with image capture capability would be required to operate on the wireless LAN. Upon entry to the facility, the CDMA phone would automatically register with the wireless LAN, which then signals the device to control image coding of all captured images. Image coding is controlled for all captured images regardless of whether the image is stored on the device or used for transmissions on either the WLAN and on the CDMA network. As a result images could be blurred to prevent transmission of video images of documents, prototype devices, meeting announcements, etc.

Figure 7:
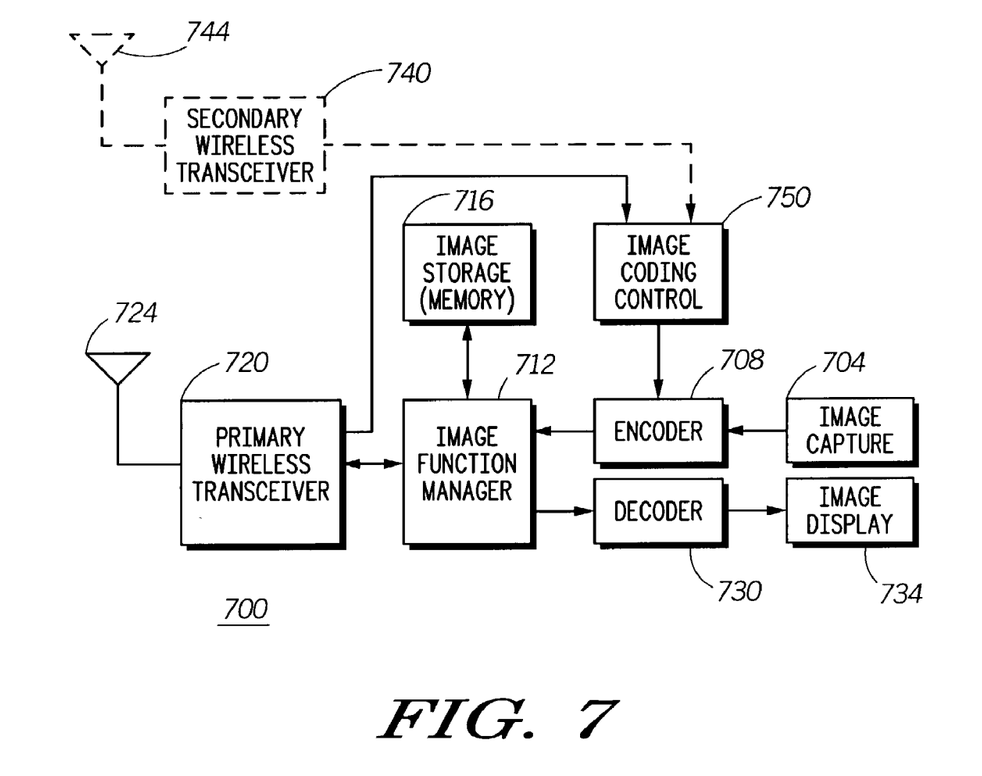
FIG. 7 is a block diagram of a wireless transmitting device consistent with certain embodiments of the present invention.

An exemplary wireless image capturing and transmitting device suitable for operating as described herein is depicted generally in FIG. 7 as device 700. Device 700 incorporates an image capture transducer element 704 such as a CCD (Charge Coupled Device) based video or still camera. The output of image capture transducer element 704 is passed to an encoder 708 that converts signals from the image capture transducer element 704 into digital form for storage or transmission. An image function manager 712 controls flow of image data from the encoder 708 to image storage memory (e.g., flash memory) 716 and to a primary wireless transceiver 720 for broadcast over antenna 724. Images received over the antenna 724 and transceiver 720 are also managed by image function manager 712 and passed either to image storage memory 716 or a decoder 730 (or both). Decoder 730 decodes the digital image format into a signal suitable for display on the device 700's image display 734.

A secondary wireless transceiver 740 and associated antenna 744 is used to receive control information that controls image coding and passes such information to an image coding control block 750. Image coding control block 750 adjusts the resolution and quality of the image encoding based upon receipt of control information from the secondary wireless transceiver 740. In another embodiment, the wireless secondary transceiver 740 and associated antenna 744 are not provided and the control information is received from the primary wireless transceiver. Other variations will occur to those skilled in the art upon consideration of the present disclosure.

Those skilled in the art will appreciate that many variations are possible within the scope of the present invention. For example, in the example above, the control over the capture, storage and transmission of images is based on the user's proximity to the control source transmitter(s). However, other parameters can be used to determine a user's rights to transmit visual information such as user location information, user connectivity to particular network or network node, assigned rights, user ID, user profile, etc., or some combination of these parameters. In certain variations, the method enables video/image capture and transmission from information-protected locations, where the wireless connection controls the image coding of recorded video/images for all wireless protocols and image storage formats supported by the user device. Where the above examples proposed certain methods to obscure the image, other methods can be used including, but not limited to, reduction of the image quality over the entire image, omission of the image, or replacing the image with an alternate image.

In another method consistent with the invention, a network service provider can receive unmodified video, then re-processes the user live video signal to achieve the desired image content protection.

While the above embodiments use receipt of a special wireless signal, in other embodiments, control of image coding of all captured images can also be accomplished by manual code entry into a user device with a keypad entry or set to always active in the Image Function Manager (712).

Those skilled in the art will recognize that the present invention has been described in terms of exemplary embodiments that can be based upon use of programmed processors to implement functions such as those of the encoder 708, the decoder 730, the image function manager 712 and/or the image coding control 750. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using any suitable electronic storage medium such as for example disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications, permutations and variations as fall within the scope of the appended claims.

What is claimed is:

1. A method carried out at a user device, of limiting visual information that can be stored or transmitted using a transmitter, comprising:
  capturing a visual image;
  detecting a control signal at the user device, the control signal being indicative that the user device is at a location ib which imaging is restricted;
  responsive to receiving the control signal performing an optical symbol recognition routine on the image,
  comparing symbols generated by the optical symbol recognition routine to a predetermined set of symbols, and
  responsive to a symbol match generated by the optical symbol recognition in the image to one or more predetermined symbols, obscuring at least a portion of the visual image to produce an obscured visual image.

2. The method according to claim 1, wherein the control signal comprises a manual code entry.

3. The method according to claim 1, where the control signal comprises a preprogrammed setting.

4. The method according to claim 1, further comprising storing the obscured visual image.

5. The method according to claim 1, further comprising transmitting the obscured visual image.

6. A method according to claim 1, wherein the visual image comprises a still image.

7. The method in according to claim 1, wherein the visual image comprises a moving video image.

8. The method according to claim 1, wherein the obscuring comprises reducing resolution of at least a portion of the visual image to produce the obscured visual image.

9. The method according to claim 1, wherein the obscuring comprises one of blurring and distorting a portion of the image.

10. The method according to claim 1, wherein the obscuring comprises:
   detecting confidential symbols; and
   reducing resolution of at least a portion of the visual image to produce the obscured visual image.

11. The method according to claim 1, wherein the obscuring comprises replacing at least a portion of the visual image with a substitute image to produce the obscured visual image.

12. The method according to claim 11, wherein the substitute image includes a warning message of confidentiality of the document.

13. The method according to claim 1, wherein the optical symbol recognition is Matrix Matching.

14. The method according to claim 1, wherein the optical symbol recognition is Feature Extraction.

15. The method according to claim 1 further comprising determining a user parameter, and wherein the obscuring is carried out if required by the user parameter.

16. The method according to claim 15, wherein the user parameter comprises at least one of a user location, user connectivity to particular network or network node, assigned rights, user ID and a user profile.

17. The method according to claim 1, wherein the control signal controls the image coding of images for all wireless protocols and image storage formats supported by the transmitter.

18. The method according to claim 1, further comprising transmitting the visual image to a network service provider, and wherein the obscuring is carried out by the network service provider.

19. The method according to claim 1, wherein the control signal comprises a wireless signal received at the transmitter.

20. The method according to claim 1, wherein the control signal comprises a manual code entry.

21. The method according to claim 1, where the control signal comprises a preprogrammed setting in the device.

22. A method carried out at a device having a transmitter, of limiting visual information that can be stored or transmitted using the transmitter, comprising:
   capturing a visual image;
   detecting a control signal at the user device, the control signal being indicative that the user device is at a location in which imaging is restricted;
   responsive to receiving the control signal performing an optical symbol recognition routine on the image,
   comparing symbols generated by the optical symbol recognition routine to a one or more predetermined symbols,
   responsive to a symbol match generated by the optical symbol recognition in the image to one or more predetermined symbols, obscuring at least a portion of the visual image to produce an obscured visual image, and transmitting the obscured visual image.

23. The method according to claim 1, farther comprising sending a notification message that a confidential message has been wrongfully copied and attempted to be transmitted.

24. The method according to claim 23, where the notification message contains sender ID, level of security, location, and document ID.

25. An apparatus for capture and storage or transmission of a visual image, comprising:
   an image capture transducer that captures a visual image;
   a means for Optical Character Recognition;
   an encoder receiving an output of the image capture transducer;
   means for receiving a control signal indicative that the user device is at a location in which imaging is restricted
   means for receiving a control signal that determines how a captured image is to be encoded; and
   an image coding control that controls the encoding of the visual image at the encoder based upon the control signal such that at least a portion of the image can be selectively obscured under control of the control signal.

26. The apparatus of claim 25, further comprising a memory for storing the image that is selectively obscured.

27. The apparatus of claim 25, further comprising a transmitter for transmitting the image that is selectively obscured.

28. The apparatus of claim 25, wherein the means for receiving comprises a receiver that receives a wireless transmission of the control signal.

* * * * *